United States Patent Office 2,727,562
Patented Dec. 20, 1955

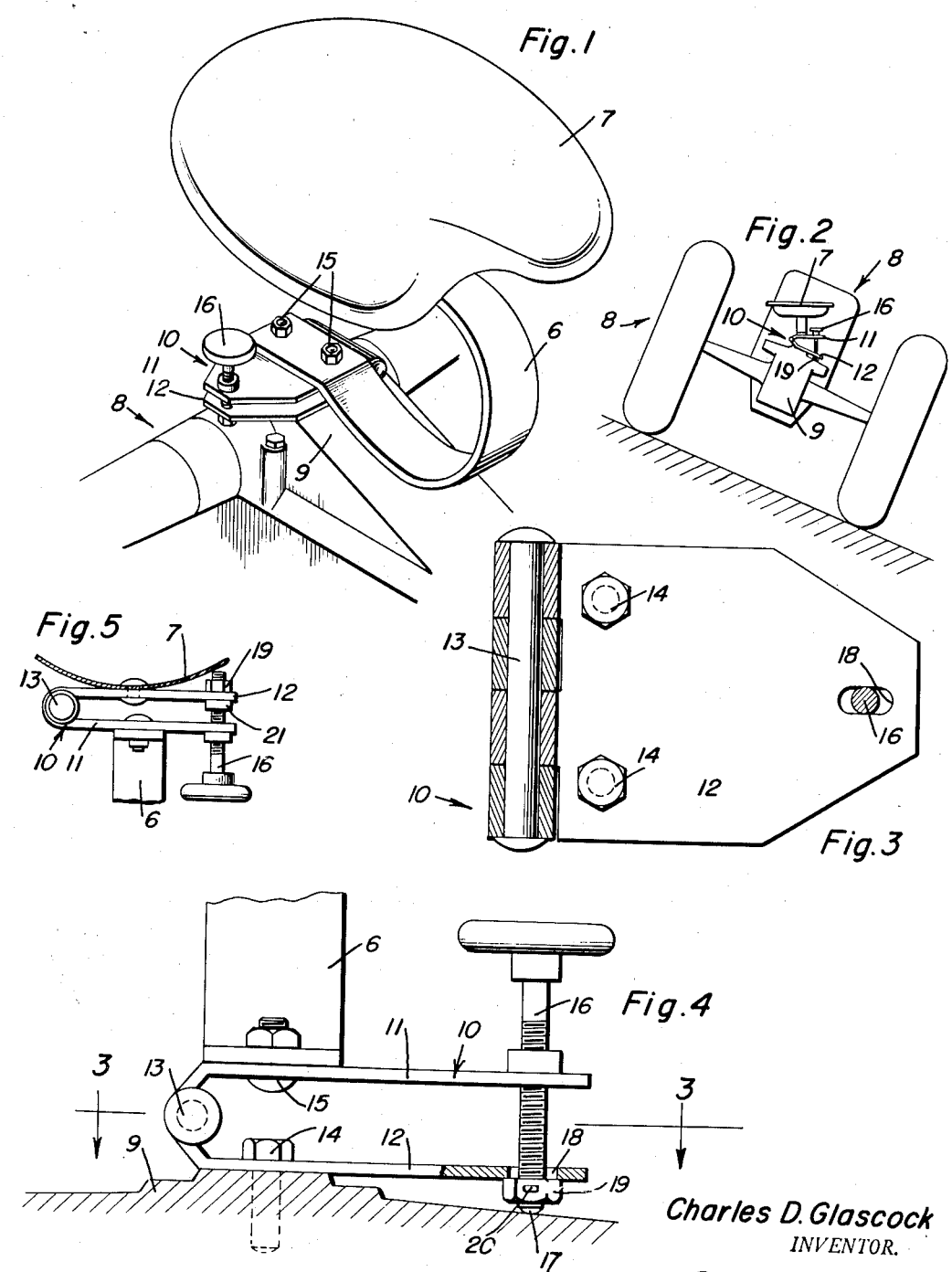

2,727,562

TRACTOR SEAT LEVELER

Charles D. Glascock, Veedersburg, Ind.

Application November 2, 1954, Serial No. 466,305

3 Claims. (Cl. 155—120)

The present invention relates generally to tractor seats, and has for its primary object to provide, in a manner as hereinafter set forth, novel means whereby such seats may be expeditiously leveled when the tractor is being used for plowing or hillside work.

Another very important object of the invention is to provide a seat leveling device of the aforementioned character which may be readily installed for use without the necessity of making material structural alterations in the tractor.

Other objects of the invention are to provide a tractor seat leveler which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view, showing a tractor seat leveler embodying the present invention installed;

Figure 2 is a rear elevational view, showing the device in use;

Figure 3 is a view in horizontal section through the device, taken substantially on the line 3—3 of Figure 4;

Figure 4 is a rear elevational view, showing the device installed with portions in section; and Figure 5 is a rear elevational view of another installation, showing a portion of the tractor seat in section.

Referring now to the drawing in detail, it will be seen that reference character 6 designates a conventional spring standard having mounted on its upper end portion the usual operator's seat 7 of a tractor 8. Interposed between the lower end portion of the standard 6 and the usual housing 9 of the tractor 8 is the adjustable base or bracket constituting the present invention which is designated generally by reference character 10.

The base 10 is in the form of a hinge unit comprising spaced upper and lower metallic plates 11 and 12, respectively, which are hingedly connected at one end, as at 13. The inner portion of the lower plate 12 is apertured to accommodate bolts 14 for firmly securing said plate in position on the tractor housing 9. Then, the upper plate 11 is provided in its inner portion with openings for the passage of bolts 15 for securing the seat standard 6 in position thereon.

A hand screw 16 is threaded through the free end portion of the upper plate 11. The screw 16 extends downwardly through the lower plate 12 and terminates in a rounded lower end portion 17 which rests on the housing 9. A slot 18 in the plate 12 accommodates the screw 16. A stop nut 19 is threaded on the screw 16 and engaged beneath the plate 12. A cotter pin 20 secures the nut 19 in adjusted position.

It is thought that the manner in which the device functions will be readily apparent from a consideration of the foregoing. Briefly, to adjust the tractor seat 7 in one direction, as seen in Figure 2 of the drawing, the screw 16 is turned in a direction to swing the upper plate 11 upwardly. When thus adjusted, the nut 19 serves as an anchor for limiting the upward swinging movement of the plate 11. To adjust the tractor seat 7 in the opposite direction, the screw 16 is turned in a direction to swing the upper plate 11 downwardly on the hinge 13. In the installation shown in Figure 5 of the drawing, which is for certain types or makes of tractors, the base 10 is inverted and interposed between the seat 7 and the upper end portion of the standard 6. When thus used, a nut 21 is threaded on the screw 16 for supporting the free end of the plate 12. The screw 16 is turned in either direction to swing the plate 12 upwardly or downwardly for adjusting the seat 7 as desired.

It is believed that the many advantages of a tractor seat leveler constructed in accordance with the present invention will be readily understood and although preferred embodiments of the device are as illustrated and described, it is to be understood that changes in the details of construction may be resorted to which will fall within the scope of the invention as claimed.

What is claimed is:

1. A tractor seat leveler of the character described comprising: a base including a pair of vertically spaced plates hingedly connected at one end, means for securing one of the plates to a tractor, means for mounting a seat on the other of said plates, and a screw threadedly mounted in one of the plates and operatively connected to the other of said plates for adjusting said plates toward or away from each other on the hinge connection.

2. A tractor seat leveler of the character described comprising: a base including a pair of vertically spaced upper and lower plates hingedly connected at one end, means for securing the lower plate on a tractor, means for mounting a seat on the upper plate, said lower plate having an opening in its free end portion, a hand screw threadedly mounted in the free end portion of the upper plate and extending through the opening and engaged with the tractor, said screw constituting means for pivotally adjusting the upper plate in a vertical plane, and an anchor nut on the screw engaged beneath the lower plate.

3. A tractor seat leveler of the character described comprising: a base including a pair of vertically spaced plates hingedly connected at one end, means for mounting the lowermost plate on a tractor seat standard, means for securing a tractor seat on the uppermost plate, and a hand screw for adjusting the uppermost plate in a vertical plane, threadedly mounted in the free end portion of the lowermost plate, and nuts threaded on said hand screw above and below said uppermost plate.

References Cited in the file of this patent

UNITED STATES PATENTS

| | | |
|---|---|---|
| 94,388 | Briggs | Aug. 31, 1869 |
| 364,716 | Hedges | June 14, 1887 |
| 645,825 | Nash | Mar. 20, 1900 |